United States Patent Office 3,008,915
Patented Nov. 14, 1961

3,008,915
CURING LOW UNSATURATION HALOGENATED RUBBER WITH POLYMETHYLOL META-SUB-STITUTED PHENOLS
James V. Fusco, Fanwood, Samuel B. Robison, Roselle, and Alfred L. Miller, Cranford, N.J., assignors to Esso Research and Engineering Company, a corporation of Delaware
No Drawing. Filed June 11, 1957, Ser. No. 664,906
19 Claims. (Cl. 260—38)

The present invention concerns novel curing agents for low unsaturation polymers. Specifically, it relates to curing low unsaturation halogenated rubbery polymers with meta-substituted polymethylol phenols.

Heretofore, butyl rubber, which is a low unsaturation polymer, has been successfully used in curing bags, inner tubes and tires. Butyl rubber contains about 85 to 99.5% of a $C_4$ to $C_7$ isoolefin, such as isobutylene, and about 0.5 to 15% of a $C_4$ to $C_{14}$ multiolefin. It generally has a Staudinger molecular weight between about 20,000 and 300,000, a Wijs iodine number between about 0.5 and 50, and a mole percent unsaturation between about 0.5 and 15. Recently, it has been discovered that butyl rubber can be halogenated in a manner which does not noticeably degrade the molecular weight of the polymer, yet be halogenated sufficiently to produce a rubbery product which retains its tensile strength even when aged in the presence of heat.

It has now been found that halogenated butyl rubber can be cured with polymethylol meta-substituted phenols. These polymethylol curing agents are unique in that, while they will not satisfactorily cure conventional butyl rubber under ordinary conditions, they will cure halogenated butyl rubber under the same conditions.

According to one embodiment of the present invention, 100 parts by weight of halogenated butyl rubber is compounded with about 20 to 100 parts by weight of a filler, 0.25 to 10 parts by weight of an anti-tack agent, 0.25 to 5 parts by weight of an anti-oxidant and 0.5 to 30 parts by weight, preferably 1 to 10 parts, of a meta-substituted polymethylol phenol. The resulting compounded stock is then cured by heating the same until it is vulcanized, e.g., for about 1 minute to 5 hours at about 250 to 450° F. and, preferably, for 20 to 60 minutes at about 275 to 375° F. The vulcanizates formed have excellent tensile strength and flexing properties which make them suitable for many products.

In producing halogenated butyl rubber to be vulcanized in accordance with the present invention, unmodified, unvulcanized butyl rubber is carefully halogenated until it contains about at least 0.5 weight percent (preferably at least about 1.0 weight percent, but not more than about "X" weight percent of combined halogen wherein:

$$X = \frac{M_3 L}{(100-L)M_1 + L(M_2+M_3)} \times 100$$

and

L = mole percent of the multiolefin in the polymer
$M_1$ = molecular weight of the isoolefin
$M_2$ = molecular weight of the multiolefin
$M_3$ = atomic weight of the halogen Restated, there should be at least about 0.5 weight percent of combined halogen in the polymer but not more than about one atom of chlorine or 3 atoms of bromine combined in the polymer per molecule of multiolefin present therein; i.e., per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tribromophenol bromide, N-chloroacetamide, beta-bromomethyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above mentioned.

The halogenation may be accomplished in various ways. One process comprises preparing a solution of the copolymer as above, in a suitable inert liquid organic solvent such as a $C_3$ to $C_{10}$, or preferably, a $C_5$ to $C_8$, inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone, or any other known non-solvent for the butyl rubber, and dried under about 1 to 760 millimeters or higher of mercury pressure absolute at about 0° to 180° C., preferably at about 50 to 150° C. (e.g. 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 and 15.0, preferably about 0.6 to 5.0.

The meta-substituted polymethylol phenol curing agents are prepared by reacting about 1 part by weight of a meta-substituted phenol with about 0.1 to 2 parts by weight of an aldehyde at a temperature between about 50 and 300° F. for between 0.1 to 24 hours in the presence of 0.005 to 0.5 part by weight of an alkaline catalyst, such as sodium hydroxide. The reaction product may contain one or more aromatic rings depending upon whether or not the methylol compound is permitted to polymerize into a low molecular weight resin. It is preferred to use the curing agent in its monomer, dimer or trimer form. The phenol may be monohydric or polyhydric. The meta position of the phenol may be substituted with an alkyl, aryl, or alkaryl hydrocarbon group having 1 to 20 carbon atoms. It is preferred to employ a phenol having a $C_{14}$ to $C_{18}$ aliphatic hydrocarbon attached to its meta position. Only one of the two meta positions should be occupied by the hydrocarbon, leaving the other meta, the two ortho and the para position open to react with the aldehyde. For instance, a meta-substituted monohydric phenol is reacted with formaldehyde in the presence of sodium hydroxide to produce a substance having methylol groups situated in the ortho, meta or para positions, depending upon the reaction conditions. In most instances, the methylol groups are in the ortho position, e.g., 2,6-dimethylol-m-substituted phenol.

Suitable meta-substituted polymethylol curing agents include the condensation products of formaldehyde and any of the following representative substituted phenols: m-cresol, m-butyl phenol, 3-hydroxy diphenyl, m-pentadecyl phenol, m-butoxy phenol, 2-bis (3-hydroxy phenyl) propane, 3-hydroxy, 3'-butyl diphenyl and m-pentadecyl resorcinol.

The condensation of the meta hydrocarbon-substituted phenol and the aldehyde may take place in situ in the butyl rubber mix or it may be allowed to occur before compounding it with the halogenated butyl rubber. If desired, the halogenated butyl rubber may be cured at 250–450° F. for from a few minutes to several hours, with a combination consisting of the polymethylol substance and another curing agent, such as a metal oxide, sulfur, a sulfur vulcanization accelerator, or other sulfur-containing compound. In such a case, the amount of other vulcanizing agent used may be between about 0.5 and 10 p.h.r. (parts by weight per 100 parts rubber). It is also preferred to use 1 to 10 p.h.r. of a divalent metal oxide, e.g., zinc oxide as a vulcanizing aid.

Suitable sulfur-containing curing agents include, in addition to elemental sulfur, such sulfur yielding materials as 4,4'-dithio-dimorpholine, vulcanization accelerators such as tellurium diethyl dithiocarbamate, tetramethyl thiuram disulfide, benzothiazyl disulfide, N-cyclohexyl-2-benzothiazole sulfenamide, etc.

Among the fillers which can be used are carbon black, clay, calcium carbonate, precipitated hydrated calcium silicate, titanium dioxide, etc. Carbon blacks exist in many forms and are generally classified as being either channel or furnace blacks depending upon how they are prepared. The meta-substituted polymethylol phenolic resin curing agents cure faster in the presence of channel blacks and for this reason these blacks are preferred where rapid cures are desired.

Insofar as anti-tack agents are concerned, compounds such as stearic acid, calcium stearate, and zinc stearate have been found to be suitable for most purposes.

Another alternative involves the use of about 2 to 40 p.h.r. of a plasticizer, such as a substantially non-volatile hydrocarbon oil boiling between about 400 and 700° F. Their use is particularly desirable where the rubber is to be used in inner tubes, conveyor belts or hoses.

The following examples are given in order to more fully illustrate the present invention.

A copolymer (GR–I–18) consisting of about 97.5% isobutylene and 2.5% isoprene having a viscosity average molecular weight of 420,000 was dissolved in hexane to form a 10% solution. A 20 weight percent (based on the polymer) of sulfuryl chloride was added to the polymer solution as the chlorinating agent and reacted for 120 minutes with the polymer. The resulting chlorinated copolymer was precipitated with acetone, collected and redissolved in hexane three times and ultimately dried and analyzed and found to have a viscosity average molecular weight of 420,000 and to contain 1.3% chlorine based on the polymer. The physical characteristics of both zinc oxide and diamine-cured vulcanizates, containing this chlorinated interpolymer, were excellent.

EXAMPLE 1

The above chlorinated butyl rubber was compounded as follows and cured for 60 minutes at 307° F.

Ingredient: Parts by weight
Chlorinated isobutylene-isoprene rubber _____ 100
SRF carbon black _____ 25
HAF carbon black _____ 25
Stearic acid _____ 0.5
Zinc oxide _____ 5
Meta-substituted polymethylol phenolic resin __ 5

In one run the curing agent was the reaction product of n-pentadecyl phenol and formaldehyde. This resinous product had a melting point of 106° C. and contained 80.85% carbon, 11.73% hydrogen and 5.21% oxygen. The m-pentadecyl dimethylol phenol resin was prepared by reacting 1 mole of m-pentadecyl phenol with 2 moles of formaldehyde in the presence of sodium hydroxide. In the second run with the chlorinated butyl the curing agent was a resin prepared from 5-pentadecyl resorcinol and formaldehyde. This resin had a melting point of 163.0° C. and contained 80.3% carbon, 11.1% hydrogen, 9.1% oxygen and 7.3% methylol groups.[1] The properties of the vulcanizates are set forth in Table I.

*Table I*

| Experiment | 1 (Phenol Resin) | 2 (Resorcinol Resin) |
|---|---|---|
| Stress-Strain: | | |
| 200% Modulus, p.s.i. | 950 | 1,300 |
| 300% Modulus, p.s.i. | 1,800 | |
| Tensile, p.s.i. | 2,000 | 1,680 |
| Elongation, percent | 330 | 260 |
| Tear Strength | 100 | 85 |
| Dynamic Modulus at 50° C.; dynes/cm.$^2 \times 10^{-7}$ | 2.72 | 3.36 |
| Goodrich Flexometer Test @ 100° C., Stroke—0.25 inch, Load 89 p.s.i.g.: | | |
| Percent Permanent Set | 1.9 | 0.9 |
| Percent Dynamic Drift | 0.1 | 0.0 |
| Temperature Rise, ° C | 18 | 13 |
| Appearance | Excellent | Excellent |

The data show that the meta-substituted curing agents produce vulcanizates that have outstanding flex and thermal stability. Rubber compounds having such properties may be advantageously used in curing bags, steam hoses, tires, conveyor belts, etc.

EXAMPLE 2

In another experiment Example 1 was repeated with the chlorinated butyl rubber as well as with a brominated isobutylene-isoprene butyl rubber (2.1% Br), using 50 parts of MPC carbon black instead of the SRF and HAF blacks. The meta-substituted resin was the condensation product of m-pentadecyl phenol and formaldehyde. The compounded rubbers were vulcanized at 307° F. for 60 and 40 minutes, respectively. Their physical properties were evaluated and the findings are set forth in Table II.

*Table II*

| Properties | Chlorinated | Brominated |
|---|---|---|
| Stress-Strain, 300% Modulus, p.s.i. | 1,575 | 2,000 |
| Tensile, p.s.i. | 2,540 | 2,570 |
| Elongation, percent | 410 | 390 |
| Goodrich Flexometer Test @ 100° C., 32 cps., 0.25" Stroke, 89 p.s.i.g.: | | |
| Percent Permanent Set | 2.8 | 3.4 |
| Percent Dynamic Drift | 0.5 | 1.9 |
| Temperature Rise, ° C | 21 | 25 |
| Appearance | Excellent | Very Good |

The results demonstrate that both brominated and chlorinated butyl rubber may be cured with these meta-substituted phenolaldehyde condensation products.

[1] Analytical procedure described in "Analytical Chemistry," vol. 23, No. 6, 883–884 (1951).

EXAMPLE 3

A series of experiments was undertaken to determine the concentration of resin which produces the best vulcanizate. Toward this end a study was made of the effect of varying amounts of the condensation product of m-pentadecyl phenol and formaldehyde on the vulcanizate properties of the same chlorinated butyl rubber used in Example 1. The resin's preparation is described in the same example. The recipes and results are shown in Table III.

EXAMPLE 5

However, resin cures of halogenated butyl can be effected by another technique which involves forming the resin in the polymer (GR–I–18) masterbatch during curing. The monomers, meta pentadecyl phenol and formaldehyde or 5-pentadecyl resorcinol and formaldehyde, are added to the masterbatch with zinc oxide and subjected to curing at elevated temperatures. The results obtained by this technique are shown in Table V.

*Table III*

CONCENTRATION OF 5-PENTADECYL PHENOL RESIN NECESSARY TO CURE CHLORINATED BUTYL

| Experiment | A | B | C | D | E |
|---|---|---|---|---|---|
| Chlorinated Butyl | | | 100 | | |
| SRF Black | | | 25 | | |
| HAF Black | | | 25 | | |
| Stearic Acid | | | 0.5 | | |
| Zinc Oxide | | | 5.0 | | |
| Sulfur | | | | | 1.5 |
| Tellurium diethyl dithiocarbamate | | | | | 1.0 |
| Benzothiazyldisulfide | | | | | 1.0 |
| 5-pentadecyl phenol resin | 1.0 | 2.5 | 5.0 | 10.0 | |
| Compounds cured 30′ @ 307° F.: | | | | | |
| Stress-Strain— | | | | | |
| 200% Modulus | 680 | 950 | 1,175 | 1,250 | 700 |
| 300% Modulus | 1,500 | 1,840 | 2,060 | | 1,480 |
| Tensile, p.s.i. | 2,380 | 2,300 | 2,180 | 2,120 | 2,450 |
| Elongation, percent | 410 | 370 | 310 | 300 | 490 |
| Shore A | 51 | 53 | 55 | 58 | 53 |
| Goodrich Flexometer Data @ 100° C., 32 cps., 0.25″ Stroke, 89 p.s.i. Load: | | | | | |
| Percent Permanent Set | 3.3 | 3.3 | 3.5 | 4.6 | 7.8 |
| Percent Dynamic Drift | 0.2 | 0.0 | 0.0 | 1.4 | 4.5 |
| Temperature Rise, °C | 29 | 27 | 27 | 30 | 28 |
| Appearance of flexed slug | Excel. | Excel. | Excel. | Excel. | Sl. Porous |

The data show that, while the best properties are obtained with 5 p.h.r., even as little as 1 p.h.r. significantly improves the flexing properties of the halogenated butyl rubber.

EXAMPLE 4

As already mentioned, these meta-substituted phenol-aldehyde resins do not satisfactorily cure butyl rubber, even when promoters, such as zinc chloride and neoprene, are employed. This is shown by the following recipes and data.

*Table IV*

BUTYL CURES WITH 5-PENTADECYL PHENOL RESIN

| Experiment | E | F | G |
|---|---|---|---|
| Butyl (GR-I-17) Isobutylene-Isoprene | 100 | 100 | 100. |
| SRF Black | 25 | 25 | |
| HAF Black | 25 | 25 | |
| MPC Black | | | 50. |
| Stearic Acid | 0.5 | 0.5 | 0.5. |
| Zinc Oxide | 5.0 | 5.0 | 5.0 |
| Neoprene | 5.0 | | |
| ZnCl₂ | | 1.0 | |
| Chlorinated Butyl (2.1% Cl) | | | 5.0. |
| 5-pentadecyl phenol resin | 12.0 | 12.0 | 12.0 |
| Compounds were Cured 60′ @ 320° F. | Poor Cure. | No Cure | No Cure. |
| The resin was the same as that used in Example 1. | | | |

*Table V*

CURES OF HALOGENATED BUTYL WITH 5-PENTADECYL PHENOL-FORMALDEHYDE AND 5-PENTADECYL RESORCINOL-FORMALDEHYDE

| | Phenol | Resorcinol |
|---|---|---|
| Chlorinated Butyl (1.3% Cl) | 100 | 100 |
| Kosmobile S-66 | 50 | 50 |
| Stearic Acid | 0.5 | 0.5 |
| Zinc Oxide | 5.0 | 5.0 |
| 5-pentadecyl phenol | 5.0 | |
| 5-pentadecyl resorcinol | | 5.0 |
| Paraformaldehyde | 2.0 | 2.0 |
| Compounds cured 60′ @ 307° F.: | | |
| Stress-strain— | | |
| 200% Modulus | | 1,000 |
| 300% Modulus | 1,050 | |
| Tensile, p.s.i. | 1,550 | 1,750 |
| Elongation, percent | 370 | 300 |
| Goodrich Flexometer Data @ 100° C., 32 cps., 0.25″ Stroke, 89 p.s.i. Load: | | |
| Percent Permanent Set | | 5.9 |
| Percent Dynamic Drift | | 2.8 |
| Temperature Rise, °C | | 30 |
| Appearance of Slug after flexing 30′ | | Good |

The data show that the condensation reaction can take place in situ and that when it occurs it will cure halogenated isobutylene-isoprene butyl rubber.

In the appended claims the expression "butyl rubber" is intended to mean a rubbery copolymer of about 85–99.5% of a $C_4$ to $C_7$ isoolefin and about 0.5 to 15% of a $C_4$ to $C_{14}$ multiolefin, said copolymer having a Staudinger mol. wt. of about 20,000 to 300,000, a Wijs iodine number of about 0.5 to 50 and a mole percent unsaturation between about 0.5 and 15.

Resort may be had to various modifications and variations of the present invention without departing from

What is claimed is:

1. A vulcanizate comprising a substantial portion of halogenated butyl rubber, a copolymer of 85 to 99.5 wt. percent of a $C_4$ to $C_7$ isoolefin and 0.5 to 15 wt. percent of a $C_4$ to $C_{14}$ multiolefin, vulcanized with the condensation product of meta hydrocarbon-substituted phenol and an aldehyde, said condensation product having one to two ring positions open on said phenol.

2. A vulcanizate comprising a substantial portion of halogenated butyl rubber, a copolymer of 85 to 99.5 wt. percent of a $C_4$ to $C_7$ isoolefin and 0.5 to 15 wt. percent of a $C_4$ to $C_{14}$ multiolefin, vulcanized with a dimethylol meta-substituted phenol, said condensation product having one to two ring positions on said phenol unsubstituted.

3. A vulcanizate comprising a substantial portion of halogenated butyl rubber, a copolymer of 85 to 99.5 wt. percent of a $C_4$ to $C_7$ isoolefin and 0.5 to 15 wt. percent of a $C_4$ to $C_{14}$ multiolefin, vulcanized with a 2,6-dimethylol meta hydrocarbon-substituted phenol, in which the para position is open, and in which the other meta position is occupied by a radical selected from the group consisting of hydrogen and hydroxy.

4. A vulcanizate according to claim 3 in which the halogenated butyl rubber is vulcanized in the presence of a metal oxide.

5. A vulcanizate comprising a filler and a substantial portion of halogenated butyl rubber, a copolymer of 85 to 99.5 wt. percent of a $C_4$ to $C_7$ isoolefin and 0.5 to 15 wt. percent of a $C_4$ to $C_{14}$ multiolefin, vulcanized with a 2,6-dimethylol-5-hydrocarbon-substituted phenol, in which the hydrocarbon substituent has 1 to 20 carbon atoms and is selected from the group consisting of alkyl, aryl and alkaryl groups, and said substituted phenol having the para position open, and the other meta position occupied by a radical selected from the group consisting of hydrogen and hydroxy.

6. A vulcanizate according to claim 5 in which the phenol is polyhydric.

7. A vulcanizate according to claim 5 in which the phenol consists of the condensation product of m-pentadecyl phenol and formaldehyde.

8. A vulcanizate according to claim 5 in which 100 parts by weight of halogenated butyl rubber is vulcanized with 1 to 10 parts of said phenol compound.

9. A vulcanizate according to claim 5 in which the filler is a carbon black.

10. A vulcanizate according to claim 5 in which the halogenated butyl rubber is vulcanized in the presence of a sulfur-containing substance.

11. A vulcanizate comprising a substantial portion of halogenated isoprene-isobutylene butyl rubber, a copolymer of 85 to 99.5 wt. percent isobutylene and 0.5 to 15 wt. percent isoprene, vulcanized with a metal oxide and a resin consisting of the condensation product of a meta hydrocarbon-substituted phenol and an aldehyde, said condensation product having one to two ring positions open on said phenol.

12. A vulcanizate according to claim 11 in which the resin contains at least 2 methylol groups.

13. A method of vulcanizing halogenated butyl rubber, a copolymer of 85 to 99.5 wt. percent of a $C_4$ to $C_7$ isoolefin and 0.5 to 15 wt. percent of a $C_4$ to $C_{14}$ multiolefin, comprising mixing a meta hydrocarbon-substituted phenol having three to four ring positions open, on said phenol and an aldehyde with said butyl rubber, shaping the mixture and heating it until the butyl rubber is vulcanized.

14. A method of vulcanizing halogenated butyl rubber, a copolymer of 85 to 99.5 wt. percent of a $C_4$ to $C_7$ isoolefin and 0.5 to 15 wt. percent of a $C_4$ to $C_{14}$ multiolefin, comprising mixing said butyl rubber with the condensation product of a meta hydrocarbon-substituted phenol and an aldehyde, said condensation product having one to two ring positions open on said phenol, shaping the mixture and heating it at an elevated temperature until it is vulcanized.

15. A method of vulcanizing halogenated butyl rubber, a copolymer of 85 to 99.5 wt. percent of a $C_4$ to $C_7$ isoolefin and 0.5 to 15 wt. percent of a $C_4$ to $C_{14}$ multiolefin, comprising compounding said butyl rubber with 0.5 to 30 parts by weight of the condensation product of a meta $C_1$-$C_{20}$ hydrocarbon-substituted phenol and formaldehyde, said condensation product having one to two ring positions open, one said phenol and 1 to 10 parts by weight of a metal oxide, shaping the compounded butyl rubber and heating it until it is vulcanized.

16. A method according to claim 15 in which the condensation product is a resin.

17. A method according to claim 15 in which the phenol is polyhydric.

18. A method according to claim 15 in which the halogenated butyl rubber is chlorinated butyl rubber.

19. A method according to claim 15 in which the halogenated butyl rubber is brominated butyl rubber.

References Cited in the file of this patent

UNITED STATES PATENTS

| | | |
|---|---|---|
| 2,631,984 | Crawford et al. | Mar. 17, 1953 |
| 2,701,895 | Tawney et al. | Feb. 15, 1955 |
| 2,732,354 | Morrissey et al. | Jan. 24, 1956 |